E. T. BUSSELL.

Improvement in Discs for Agricultural Implements.

No. 127,677.  Patented June 11, 1872.

Witnesses.
A. Ruppert.
C. F. Clausen

Inventor.
Erastus T. Bussell,
By Theodore Munger,
Attorney.

127,677

UNITED STATES PATENT OFFICE.

ERASTUS T. BUSSELL, OF INDIANAPOLIS, INDIANA, ASSIGNOR TO WILLIAM M. BUSSELL, OF SAME PLACE.

IMPROVEMENT IN DISKS FOR AGRICULTURAL IMPLEMENTS.

Specification forming part of Letters Patent No. 127,677, dated June 11, 1872; antedated May 25, 1872.

*To all whom it may concern:*

Be it known that I, ERASTUS T. BUSSELL, of Indianapolis, in the county of Marion and State of Indiana, have invented certain new and useful Improvements in Disks for Agricultural Implements, and an arrangement of the same upon a suitable frame; and I hereby declare the following to be a full, clear, and exact description of the same, reference being had to the accompanying drawing making a part of this specification, in which—

Figure 1:
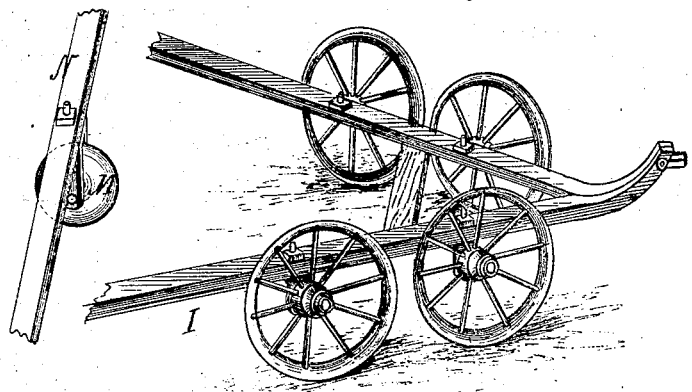
Figures 2, 3:
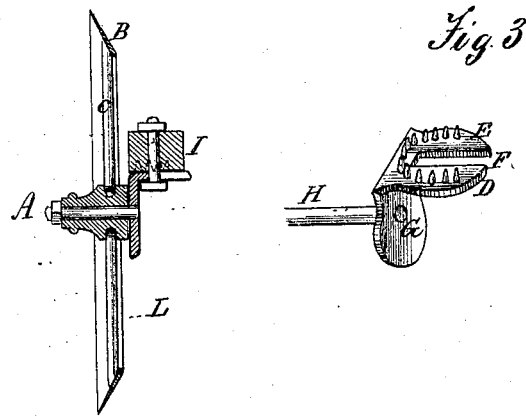

Figure 1 is a partial view in perspective of my improved disk, arranged in pairs, in combination with a colter-wheel, upon a V-shaped cultivator or harrow-frame. Fig. 2 is a vertical sectional view of my improved disk, showing the angle of the beveled continuous rim, and also a section of the adjustable bracket provided with the journal or axis upon which the disk revolves; and Fig. 3 is a view in perspective of the adjustable bracket provided with the axis aforesaid.

This invention relates to certain improvements in disks for agricultural implements; and consists, first, of a disk composed of a metallic hub, and a narrow metallic continuous rim secured to the end of light metallic spokes at a lateral angle of from five to fifteen degrees to the line of the spokes, and beveled from its inner to its outer edge to form a cutting periphery; the objects of this part of the invention being to displace the subsoil and bring it up and mix it with the surface-soil, while the surface-soil and clods are passed through the openings between the spokes, thereby being broken and pulverized, and, together with weeds and other noxious growth, deposited in the bottom of the cut and covered by the remaining subsoil. Secondly, of a right-angled adjustable bracket, having its horizontal face provided with a slot for the reception of a square-shouldered bolt, and serrated or roughened, and having a perpendicular face provided with an axis secured thereto at a right angle to the face, in combination with a disk having a cutting periphery; the objects of this part of the invention being to permit the cutting periphery of the disk to be presented to the soil at different angles, and to provide a simple and efficient medium for attaching said disk to the frame upon which it may be used.

In the drawing, A is the metallic hub; B, the narrow metallic continuous rim; and C, the light metallic spokes connecting the hub A and the rim B. The rim B may be beveled on either or both sides to form the cutting periphery, and is cast upon the spokes C at an angle of from five to fifteen degrees. D is the right-angled adjustable bracket; its horizontal face E has the slot F for the reception of a square-shouldered bolt, and is also serrated or roughened that the teeth or projections thereon may penetrate the surface with which they contact, and retain the bracket D at whatever angle it may have been placed. The perpendicular face G of the bracket D has the axis H, upon which the disk L revolves, secured thereto. In Fig. 1 the disks L are secured to the frame I, each disk having an independent axis, H, upon an adjustable bracket, D, at an angle oblique to the line of draft. The disks L are arranged in pairs, each one of a pair being directly opposed both in position and effect. Any desired number of pairs may be used. A colter-wheel, M, located centrally on the rear cross-bar N of the frame I, serves to guide the machine, and also prevents the rear disks L from hobbling or jumping from side to side.

Having thus described my invention, what I claim as new and useful, and desire to secure by Letters Patent, is—

1. The disk L, composed of the metallic hub A and the narrow metallic continuous rim B, secured to the end of the light metallic spokes C at a lateral angle of from five to fifteen degrees to the line of the spokes C, and beveled from its inner to its outer edge to form a cutting periphery, for the purpose hereinbefore set forth.

2. The right-angled adjustable bracket D, having its horizontal face E serrated or roughened and provided with the slot F, and its perpendicular face G provided with the axis H, in combination with a cultivator-disk having a cutting periphery, for the purpose hereinbefore set forth.

In testimony that I claim the foregoing improvements in disks for agricultural implements, and their arrangement upon a frame, as above described, I have hereunto set my hand and seal this 20th day of October, 1871.

ERASTUS T. BUSSELL. [L. S.]

Witnesses:
A. RUPPERT,
E. A. NEWMAN.